Jan. 28, 1941.     J. H. McNABB     2,229,861
ELECTRICAL CIRCUIT DEVICE
Filed Oct. 28, 1938

Inventor:
Joseph H. McNabb
By: Robert F. Miehle Jr.
att'y.

Patented Jan. 28, 1941

2,229,861

UNITED STATES PATENT OFFICE 2,229,861

ELECTRICAL CIRCUIT DEVICE

Joseph H. McNabb, Winnetka, Ill., assignor to The Bell & Howell Company, Chicago, Ill., a corporation of Illinois Application October 28, 1938, Serial No. 237,550

2 Claims. (Cl. 88—16)

My invention relates particularly to electrically driven motion picture cameras although not limited to this use alone.

In electrically driven motion picture cameras of the field or hand type it has been customary to mount the battery, supplying the electrical energy, on or within the camera with the result that the camera is heavy and cumbersome whereas it is desirable that a camera of this type be light and compact. However, separation of the battery from the camera necessitates circuit connections from the battery to the camera which in their usual form are in the way as well as being unsightly.

It is the prime object of my invention to provide novel and desirable circuit connections between an electrically driven motion picture camera or the like and a separate source of energy such as a portable electrical battery to the end of obviating the objections to this type of apparatus.

With this object in view my invention consists in certain features of novelty in the construction, combination, and arrangement of parts by which the said object and certain other objects, hereinafter appearing, are effected all as fully described with reference to the accompanying drawing and more particularly pointed out in the appended claims.

In the said drawing—

Figure 5:
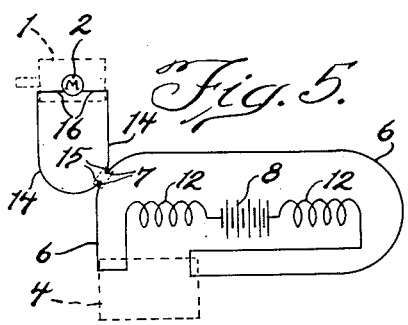
Figure 5 is a diagrammatic view of the electrical circuit connections of the device.

Referring to the drawing, 1 designates generally a photographic camera of the motion picture type which is provided with an electric motor 2, see Figure 5, for driving the mechanism of the camera in a usual manner. The camera 1, as shown, is of the field or hand type and is adapted to be held in the hands of the user as shown in Figure 1, although it may be mounted on a tripod 3 as shown in Figure 2.

Figure 1:
Figure 1 is a perspective view showing an electrically driven motion picture camera and its attendant carrying case embodying my invention as carried by the user for photographing.

A usual carrying case 4 provides for carrying the camera 1 therein, and a carrying strap or cord 5 has its opposite ends attached to the carrying case in a suitable manner and may be slung over the shoulder of the user, as shown in Figure 1, for the carrying of the carrying case and its contents without employing the hands of the user as is usual.

The body of the carrying strap 5 may be of any suitable material such as molded soft rubber and has embedded therein two metal strips 6 forming electrical conductors which extend longitudinally thereof from the carrying case and terminate with adjacent exposed circuit contacts 7 disposed remote from the carrying case and preferably located so that they are disposed at the front of the shoulder region of the user when the carrying case is carried as shown in Figure 1.

Figure 2:
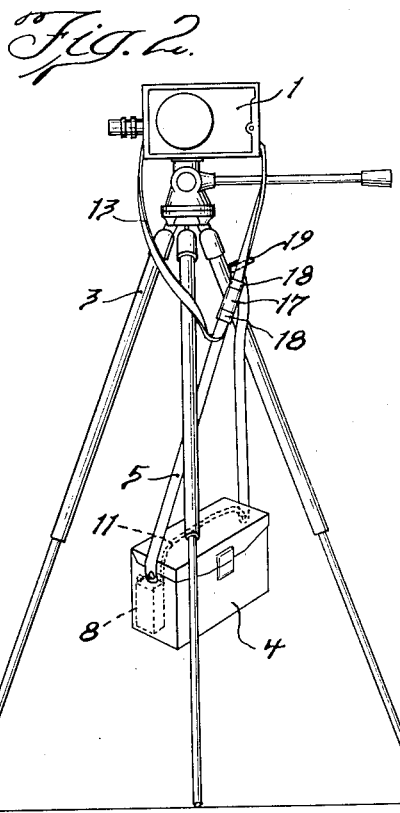
Figure 2 is a view of the camera and its attendant carrying case as mounted on a tripod for photographing.
Figure 3:
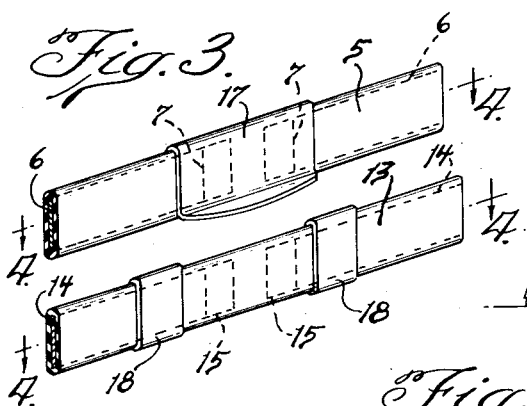
Figure 3 is a partial view of the camera and camera carrying case straps in separated relation and showing the separable circuit connecting means thereof as hereinafter described.
Figure 4:
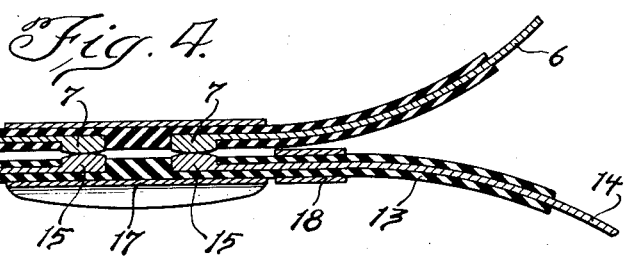
Figure 4 is a partial longitudinal section of the camera carrying case and camera carrying strap, substantially on the lines 4—4 of Figure 3, and showing the aforesaid separable circuit connecting means thereof in circuit contacting condition.

An electric battery 8 may be carried in a pocket 9 of the user's garment, as shown in Figure 1, or within the carrying case 4, as shown in Figure 2, and is connected with the conductors 6 of the carrying strap 5 at the carrying case by means of an extension cord 11 comprising two electrical conductors 12, thus energizing the conductors 6 and the contacts 7 of the carrying strap from the battery.

Another carrying strap 13 has its opposite ends attached to the camera 1, and, as shown, the body thereof is of suitable material such as molded soft rubber and has embedded therein two metal strips 14 forming electrical conductors which extend longitudinally thereof from the camera and terminate with adjacent exposed circuit contacts 15 disposed remote from the camera. The conductors 14 are connected in any suitable manner with the motor 2, as indicated at 16 in Figure 5, for the energization of the motor from these conductors.

The carrying case strap 5 has a spring clip 17 of channel formation secured thereto and embracing the same at the region of the circuit contacts 7 which is adapted to releasably embrace the camera carrying strap 13 and engage the circuit contacts 7 and 15 and thus electrically connect the conductors 6 and 14 to complete the circuit connections between the motor 2 of the camera and the battery 8. Spaced collars 18 are secured on the carrying strap 13 for engagement of the clip 17 therebetween to position the carrying straps 5 and 13 with the contacts 7 and 15 in registry.

Thus is provided a separable circuit connecting means operative to connect the conductors 6 and 14 of the carrying straps 5 and 13, which permits ready connection and disconnection of these carrying straps particularly with reference to placing the camera in the carrying case when the camera is not in use.

The carrying straps 5 and 13 provided with their electrical conductors not only serve their usual function as carrying straps but also serve as circuit connections, thus obviating the necessity of separate circuit connections to the camera and attendant unsightliness and interference in the use of the camera.

Where the camera is mounted on a tripod as in Figure 2, the battery 8 and extension cord 11 may be placed in the carrying case and the carrying case suspended from the tripod by slinging the carrying strap over a projecting stud 19 on the tripod.

While I have thus described my invention, I do not wish to be limited to the precise details described as changes may be readily made without departing from the spirit of my invention, but having thus described my invention, I claim as new and desire to secure by Letters Patent the following:

1. In a device of the character described, the combination of a camera carrying case, a source of electrical energy carried in adjacent relation therewith, a shoulder strap attached to said case for carrying the same suspended from a person's shoulder and provided with electrical conductors extending longitudinally thereof and connected with said source in the region of said case, a photographic camera adapted to be carried in said case and removable therefrom and provided with an electrically energized actuating device and with electrical conductors extending therefrom and connected with said actuating device, and separable circuit connections operative to connect said first and second mentioned conductors remote from said carrying case and camera.

2. In a device of the character described the combination of a camera carrying case, a source of electrical energy carried in adjacent relation therewith, a shoulder strap attached to said case for carrying the same suspended from a person's shoulder and provided with electrical conductors extending longitudinally thereof and connected with said source in the region of said case, a photographic camera adapted to be carried in said case and removable therefrom and provided with an electrically energized actuating device, a carrying strap attached to said camera and provided with electrical conductors extending longitudinally thereof and connected with said actuating device, and separable circuit connections operative to connect said first and second mentioned conductors remote from said carrying case and camera.

JOSEPH H. McNABB.